United States Patent
Dropps (10) Patent No.: US 9,264,383 B1
(45) Date of Patent: Feb. 16, 2016

(54) SYSTEMS AND METHODS FOR QUALITY OF SERVICE FOR LINK AGGREGATION GROUPS

(71) Applicant: QLOGIC, Corporation, Aliso Viejo, CA (US)

(72) Inventor: Frank R. Dropps, Maple Grove, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 95 days.

(21) Appl. No.: 14/042,111

(22) Filed: Sep. 30, 2013

(51) Int. Cl.
*H04L 12/931* (2013.01)

(52) U.S. Cl.
CPC .................................. *H04L 49/351* (2013.01)

(58) Field of Classification Search
CPC ................... H04L 12/4641; H04B 2203/5408; H04B 2203/5437
See application file for complete search history.

(56) References Cited

U.S. PATENT DOCUMENTS

| | | | |
|---|---|---|---|
| 8,201,168 B2 * | 6/2012 | Haviv et al. | 718/1 |
| 8,214,467 B2 * | 7/2012 | Dake et al. | 709/220 |

* cited by examiner

*Primary Examiner* — Chandrahas Patel
(74) *Attorney, Agent, or Firm* — Klein, O'Neill & Singh, LLP (57) ABSTRACT

Method and system for a network device having a plurality of ports for sending and receiving information is provided. The device includes a global quality of service (QOS) module for receiving QOS information from a plurality of QOS modules regarding bandwidth used by the plurality of ports for sending information. For selecting a request from among a plurality of pending requests from the plurality of ports to transmit information, the global QOS module adds bandwidth consumed by the plurality of ports when the ports belong to a non-local link aggregation group (LAG). The global QOS module uses local QOS information from a same QOS bin assigned to the plurality of ports, when the plurality of ports belong to a local LAG.

16 Claims, 9 Drawing Sheets

Figure 8

SYSTEMS AND METHODS FOR QUALITY OF SERVICE FOR LINK AGGREGATION GROUPS

TECHNICAL FIELD

The present embodiments relate to quality of service in networks.

BACKGROUND

Mixing protocols on a same network device may need different quality of service (QOS) methods. For example, for Fibre Channel protocol, QOS may be used to balance traffic across multiple Inter-Switch Links (ISLs). For Ethernet QOS may be used to implement QCN and ETS. Implementing QOS becomes complex when a port is a part of a link aggregation group (LAG) because ports for a LAG may not be in close physical proximity but have to share bandwidth. Continuous efforts are being made to provide QOS for ports participating in LAGs.

BRIEF DESCRIPTION OF THE DRAWINGS

The various present embodiments now will be discussed in detail with an emphasis on highlighting the advantageous features. These embodiments depict the novel and non-obvious systems and methods for quality of service in networks shown in the accompanying drawings, which are for illustrative purposes only. These drawings include the following figures, in which like numerals indicate like parts:

FIG. 1 is a functional block diagram of a network that the present embodiments may be used in connection with;

DETAILED DESCRIPTION

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of non-transitory medium for retaining information in any form, including various kinds of storage devices (magnetic, optical, static, etc.).

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process.

Various standards and protocols may be used to enable network communications, including Fibre Channel (FC) technology, Fibre Channel over Ethernet (FCoE), Ethernet, and others. Below is a brief introduction to some of these standards. The present embodiments are described herein with reference to the Fibre Channel and Ethernet technologies. However, these technologies are used merely for ease of reference and to provide examples. The present embodiments are not limited to Fibre Channel and Ethernet standards.

Fibre Channel (FC) is a set of American National Standards Institute (ANSI) standards. Fibre Channel technology provides a serial transmission protocol for storage and network protocols such as HIPPI, SCSI, IP, ATM and others. Fibre Channel provides an input/output interface to meet the requirements of both Channel and network users. The Fibre Channel standards are incorporated herein by reference in their entirety.

Fibre Channel supports three different topologies: point-to-point, arbitrated loop and Fibre Channel Fabric. The point-to-point topology attaches two devices directly. The arbitrated loop topology attaches devices in a loop. The Fabric topology attaches computing systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes them to other ports. Fibre Channel switches use memory buffers to hold packets received and sent across a network. Associated with these buffers are credits, which are the number of packets that a buffer can hold per Fabric port.

Ethernet is a family of computer networking technologies for local area networks (LANs). Systems communicating over Ethernet divide a stream of data into individual packets called packets. Each frame includes source and destination addresses and error-checking data so that damaged data can be detected and re-transmitted. Ethernet is described in IEEE 802.3, which is incorporated herein by reference in its entirety.

Fibre Channel over Ethernet (FCoE) is a converged network and storage protocol for handling both network and storage traffic. The FCoE standard enables network adapters and network switches to handle both network and storage traffic using network and storage protocols. Under FCoE, Fibre Channel packets are encapsulated in Ethernet packets. Encapsulation allows Fibre Channel to use Gigabit Ethernet networks (or higher speeds) while preserving the Fibre Channel protocol.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer is a cloud platform and cloud infrastructure, followed by a "server" layer that includes hardware and computer software designed for cloud-specific services.

Figure 1:
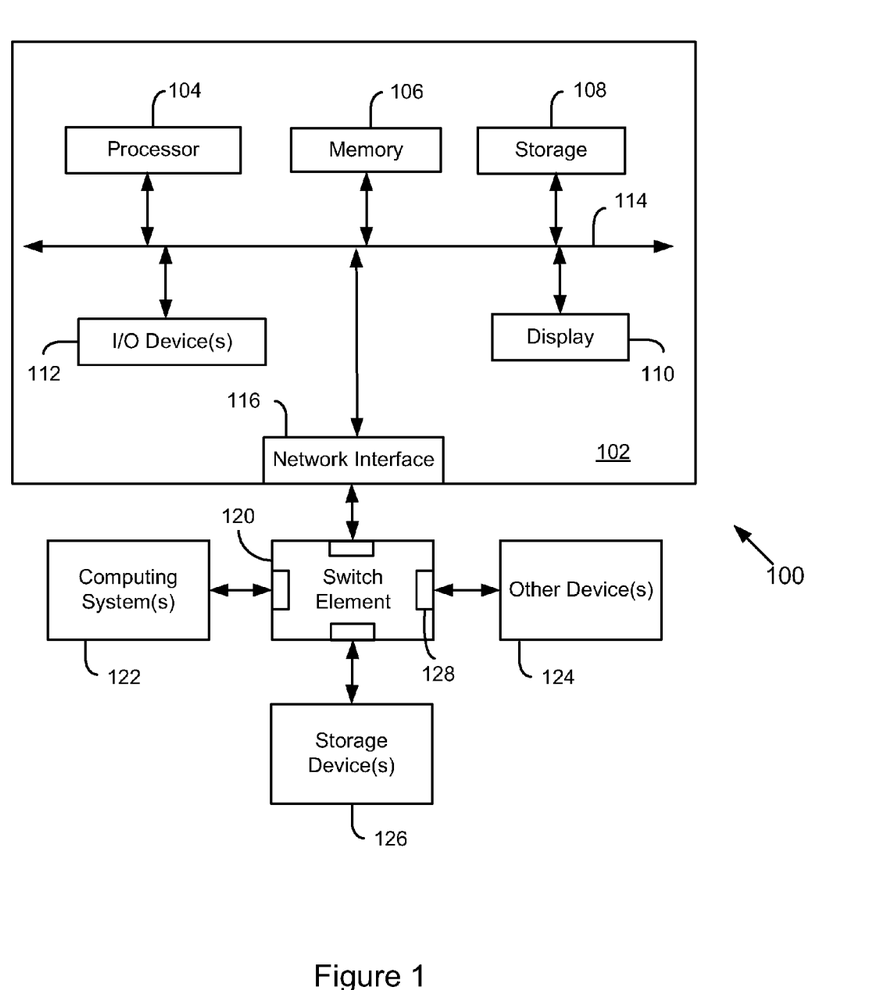

System 100:

FIG. 1 shows an example of a system 100 that may be used in connection with the present embodiments. System 100 may include a computing system 102, which may be referred to as a host system. A typical host system 102 includes several functional components, including a central processing unit (CPU) (also referred to as a processor or processing module) 104, a host memory (or main/system memory) 106, a storage device 108, a display 110, input/output ("I/O") device(s) 112, and other components (or devices). The host memory 106 is coupled to the processor 104 via a system bus or a local memory bus 114. The processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware-based devices.

The host memory 106 provides the processor 104 access to data and program information that is stored in the host memory 106 at execution time. Typically, the host memory 106 includes random access memory (RAM) circuits, read-only memory (ROM), flash memory, or the like, or a combination of such devices.

The storage device 108 may comprise one or more internal and/or external mass storage devices, which may be or may include any conventional medium for storing large volumes of data in a non-volatile manner. For example, the storage device 108 may include conventional magnetic disks, optical disks such as CD-ROM or DVD-based storage, magneto-optical (MO) storage, flash-based storage devices, or any other type of non-volatile storage devices suitable for storing structured or unstructured data.

The host system 102 may also include a display device 110 capable of displaying output, such as an LCD or LED screen and others, and one or more input/output (I/O) devices 112, for example, a keyboard, mouse, etc. The host system 102 may also include other devices/interfaces for performing various functions, details of which are not germane to the inventive embodiments described herein.

The host system 100 also includes a network interface 116 for communicating with other computing systems 122, storage devices 126, and other devices 124 via a switch 120 and various links. The network interface 116 may comprise a network interface card (NIC) or any other device for facilitating communication between the host system 102, other computing systems 122, storage devices 126, and other devices 124. The network interface 116 may include a converged network adapter for processing information complying with storage and network protocols, for example, Fibre Channel and Ethernet. As an example, the network interface 116 may be a FCoE adapter. In another embodiment, the network interface 116 may be a host bus adapter, for example, a Fibre Channel host bus adapter.

In one embodiment NIC 116 includes a processor, memory and at least one port. The processor executes firmware for NIC 116 and the port is used to receive and send information. The embodiments disclosed herein may be implemented at NIC 116.

In one embodiment, the processor 104 of the host system 104 may execute various applications, for example, an e-mail server application, databases, and other application types. Data for various applications may be shared between the computing systems 122 and stored at the storage devices 126. Information may be sent via switch 120 ports. The term port as used herein includes logic and circuitry for receiving, processing, and transmitting information.

Each device (e.g. the host system 102, the computing systems 122, the storage devices 126, and the other devices 124) may include one or more ports for receiving and transmitting information, for example, node ports (N_Ports), Fabric ports (F_Ports), and expansion ports (E_Ports). Node ports may be located in a node device, e.g. the network interface 116 of host system 102 and interface (not shown) for the storage devices 126. Fabric ports are typically located in Fabric devices, such as the switch 120. Details regarding the switch 120 are provided below.

Figure 2A:
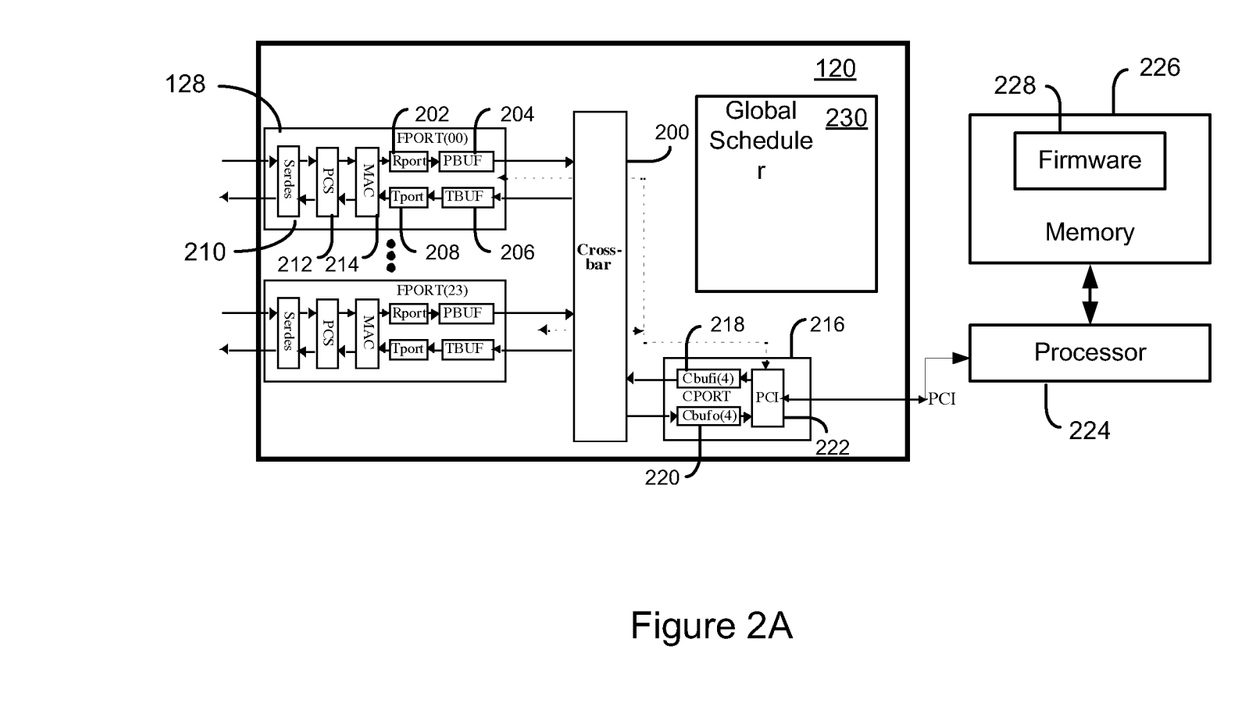
FIG. 2A is a functional block diagram of a switch element, according to the present embodiments.

FIG. 2A is a high-level block diagram of switch 120, also referred to as the switch element 120. Switch element 120 may be implemented as an application specific integrated circuit (ASIC) having a plurality of ports 128. As an example, ports 128 of FIG. 2A are drawn on the same side of the switch element 120. However, ports 128 may be located on any or all sides of switch element 120. This does not imply any difference in port or ASIC design. The actual physical layout of the ports will depend on the physical layout of the ASIC.

Ports 128 may be generic (GL) and may include an N_Port, F_Port, FL_Port, E-Port, or any other port type. Ports 128 may be configured to operate as Fibre Channel, FCoE or Ethernet ports. In other words, depending upon what it is attached to, each GL port can function as any port type.

Ports 128 communicate via a switch crossbar 200, which includes a plurality of switch crossbars for handling specific types of data and data flow control information. For illustration purposes only, the switch crossbar 200 is shown as a single crossbar. Switch crossbar 200 may be a connectionless crossbar (packet switch) of conventional design, sized to connect a plurality of paths. This is to accommodate ports 128 plus a port 216 for connection to a processor 224 that may be external to the switch element 120. In another embodiment, the processor 224 may be located within a switch chassis that houses the switch element 120.

Each port 128 receives incoming packets (or information) and processes the packets according to various protocol requirements. The port 128 includes a shared pipeline for receiving packets (or information). The pipeline includes a serializer/deserializer (SERDES) 210, a physical coding sublayer (PCS) 212, and a media access control (MAC) sub-layer 214. The SERDES 210 receives incoming serial data and converts it to parallel data. The parallel data is then sent to the PCS 212 and the MAC 214 for processing before being sent to a receive segment (or receive port (RPORT)) 202.

The RPORT 202 temporarily stores received packets at a memory storage device, shown as PBUF (pause buffer) 204. The packets are then sent to a transmit segment (or transmit port (TPORT) via the crossbar 200 and a transmit buffer (TBUF) 206. The TBUF 206 is a temporary memory storage device where packets or information related to packets are staged before being transmitted.

The switch element 120 may also include a control port (CPORT) 216 that communicates with the processor 224. The CPORT 216 may be used for controlling and programming the switch element 120. In one embodiment, the CPORT 216 may include a PCI (Peripheral Component Interconnect) 222 interface to enable the switch element 120 to communicate with the processor 224 and a memory 226. The processor 224 controls overall switch element operations, and the memory 226 stores firmware instructions 228 for controlling switch element 120 operations.

The CPORT 216 includes an input buffer (CBUFI) 218, which is used to transmit packets from the processor 224 to the ports 128. The CPORT 216 further includes an output buffer (CBUFO) 220, which is used to vector packets from the PBUFs 204, the TBUFs 206, and CBUFI 218 to the processor 224.

Port 128 described above may be referred to as a "base port" that may have more than one network link available for receiving and transmitting information. Each network link allows the base port to be configured into a plurality of sub-ports, each uniquely identified for receiving and sending packets. The various sub-ports/base ports may be configured to operate at different rates and support different protocols. For example, base port 128 may be configured to operate as four single lane Ethernet ports, three single lane Ethernet ports and one single lane Fibre Channel port, two single lane Ethernet ports and two single lane Fibre Channel ports, one single lane Ethernet port and three single lane Fibre Channel port, four single lane Fibre Channel port, two double lane Ethernet ports, one double lane Ethernet port and two single lane Ethernet ports, one double lane Ethernet port, one single lane Ethernet port and one single lane Fibre Channel port, one double lane Ethernet port and two single lane Fibre Channel port, one four lane Ethernet port or one four lane Fibre Channel port. Port 128 uses some logic that is shared among the multiple sub-ports and some logic that is dedicated to each sub-port.

Switch element 120 also includes a global scheduler 232 (also referred to as scheduler 230. Scheduler 230 arbitrates between requests for packets that are stored at various ports, as described below in detail. In one embodiment, quality of service (QOS) information for ports within a link aggregate group (LAG) is used for arbitrating between requests that may be pending at any given time. QOS means that each port is guaranteed a certain amount of available bandwidth.

LAG is a method of inverse multiplexing using multiple Ethernet links, thereby increasing bandwidth and providing redundancy. LAGs are defined by the IEEE 802.1AX-2008 standard that allows one or more links to be aggregated together to form a LAG, such that a MAC (Media Access Control) client can treat the LAG as if it were a single link. This Layer 2 transparency may be achieved by the LAG using a single MAC address for all the device ports in the LAG group. LAG can be configured as either static or dynamic. Dynamic LAG uses a peer-to-peer protocol for control, called the Link Aggregation Control Protocol (LACP). This LACP protocol is defined within the 802.1AX-2008 standard.

A LAG may be local or non-local. A local LAG includes sub-ports that are from the same base-port. A non-local LAG includes ports that may not all be from a same base-port. LAGs may be configured by a network administrator using a management application that is executed by a computing system (for example, 102). The LAG membership information may be stored as part of the port configuration information, as described below in detail. The use of QOS for LAGs is described below in detail.

Figure 2B:
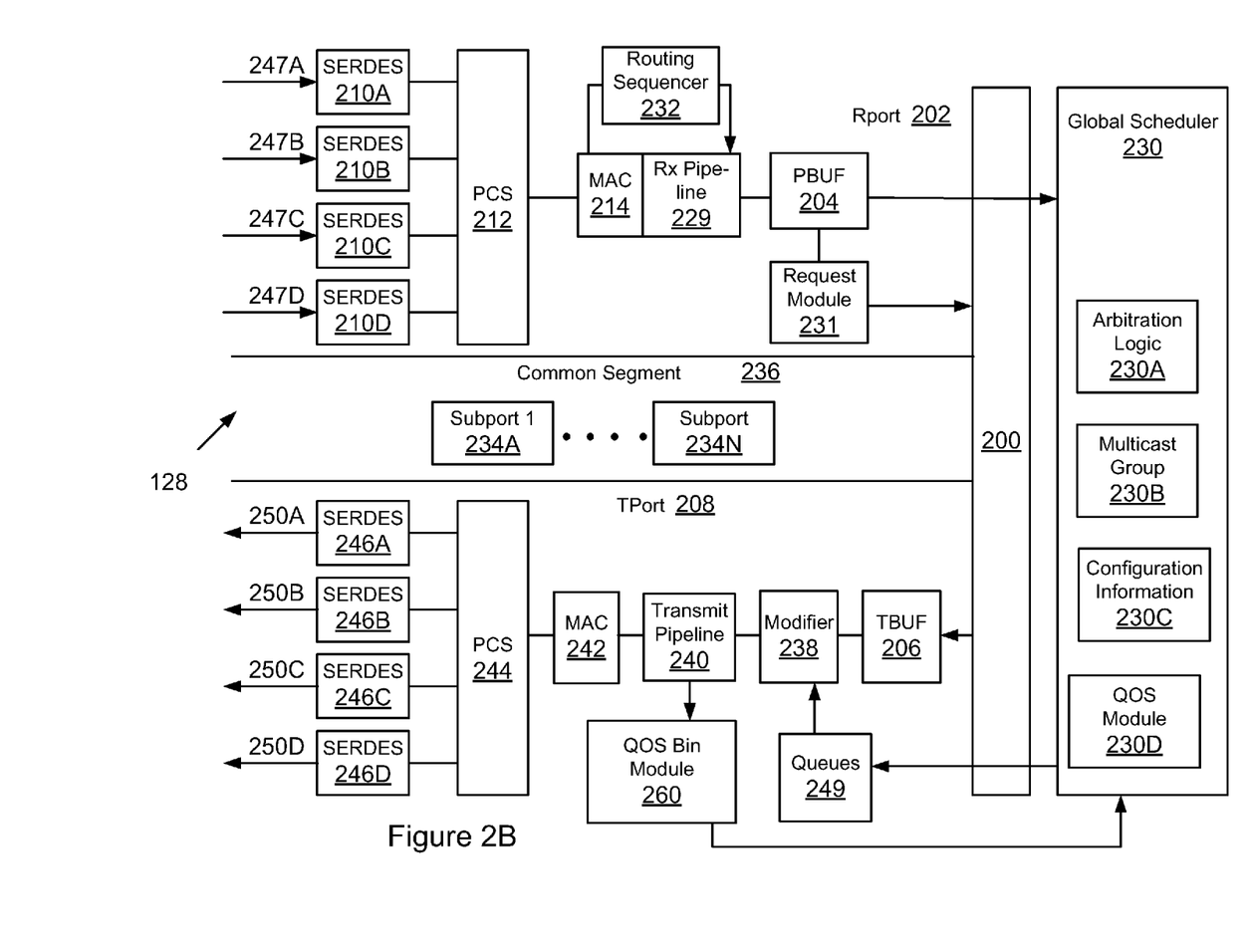
FIG. 2B is a functional block diagram of a base port, according to the present embodiments.

FIG. 2B shows an example of base port 128 having RPORT (receive segment) 202, TPORT (transmit segment) 208, and a common segment 236, according to one embodiment. RPORT 202 is used for receiving and processing packets, while TPORT 208 is used for transmitting packets. Common segment 236 is used to store configuration and status information that may be commonly used among different components of base port 128.

In one embodiment, base port 128 may be configured to include a plurality of sub-ports. The configuration, status, and statistics information/logic 234A-234N for each sub-port may be stored in common segment 236. The configuration logic 234A-234N may include look up tables or other data structures. In one embodiment, common segment 236 may store information indicating which sub-ports may be a part of a local LAG.

RPORT 202 may include or be coupled to a plurality of network links, for example, four independent physical network links 247A-247D, each configured to operate as a portion of an independent sub-port within base port 128. Each network link is coupled to a SERDES 210A-210D, all of which share PCS 212 and MAC 214. The multiple lanes also share a receive pipeline 229 that is used for pre-processing received packets before they are transferred. Both MAC 214 and receive pipelines 229 are time multiplexed (i.e. each sub-port of the base-port 128 is provided with access to the pipeline during a certain phase of a system clock) so that they can be shared among the plurality of links based on how the ports are configured to operate. In one embodiment, PCS 212 and MAC 214 may be a part of the receive pipeline 229.

Incoming packets are received via one of the network links 247A-247D. A received frame is processed by the appropriate SERDES and then sent to the PCS 212. After PCS 212 processes the frame, the frame is provided to MAC 212 that is time-shared among a plurality of sub-ports. Thus, for a certain time segment (for example, a clock cycle), MAC 214 may be used by one of the sub-ports. After the MAC 212 processes the frame it is sent to receive pipeline 229 that is also time-shared.

Information regarding the frame or a copy of the frame is also provided to a routing sequencer 232 that determines a destination for the received frame. In one embodiment, a frame whose destination is processor 224 is given the highest priority, followed by a frame that is routed by a TCAM (ternary content addressable memory) or steering registers (not shown) located within the routing sequencer 232. More than one routing sequencer 232 may be used for each base port 128. Packets that are ready to be sent out are staged at PBUF 204. PBUF 204 may have a plurality of queues (or slots) that may be referred to as receive queues. The receive queues temporarily store packets, until a request to move each frame is granted.

To move packets from the receive queues, a request module 231 generates requests for scheduler 230. Request module 231 maintains a data structure (not shown) that tracks a number of requests that may be pending for each sub-port. Request module 231 also removes requests from the data structure when a grant is received for a particular request.

Scheduler 230 includes arbitration logic 230A that performs dual stage arbitration for requests from various base ports as described below with respect to FIG. 6. Scheduler 230 also maintains a data structure at a memory labeled as multicast group 230B. The data structure stores information for identifying multicast groups that may receive multicast packets, e.g., packets that are destined to multiple destinations. Scheduler 230 stores configuration information 230C for various ports and some of that information may be used to select requests. In one embodiment, configuration information 230C may be used to store information regarding ports that are in a non-local LAG.

Global scheduler 230 also includes a Global QOS module 230D (also referred to as QOS module 230D) for providing QOS for ports within a LAG, as described below in detail.

Packets for transmission via TPORT 208 move via TBUF 206 and a modifier 238. In one embodiment, modifier 238 may be used to insert or remove information from an outgoing frame. The modification may be based on the frame type. The time-shared transmit pipeline 240 and MAC 242 are used to process outgoing packets. PCS 244, SERDES 246A-246D are used similarly to PCS 212 and SERDES 210A-210D. Network links 250A-250D are similar to links 247A-247D, except links 250A-250D are used to transmit packets. Furthermore, although separate MAC and PCS are shown for the transmit segment, the same PCS and MAC of the receive segment may be used in the transmit segment.

With further reference to FIG. 2B, each base port 128 includes a QOS bin module 260 (or a local QOS bin module 260) and transmit queues 249. The QOS bin module 260 may be used to implement local QOS bins at a base-port level. Each QOS bin at QOS bin module 260 monitors bandwidth consumed by a source traffic group and adjusts the scheduler QOS priority for a sub-port, as described below with respect to FIG. 4. In one embodiment, a same QOS bin may be allocated to sub-ports of a local LAG. Global QOS module 230D receives input from QOS bin module 260 and adjusts QOS priority, when a port is a member of a non-local LAG, as described below in detail with respect to FIG. 2C.

Figure 2C:
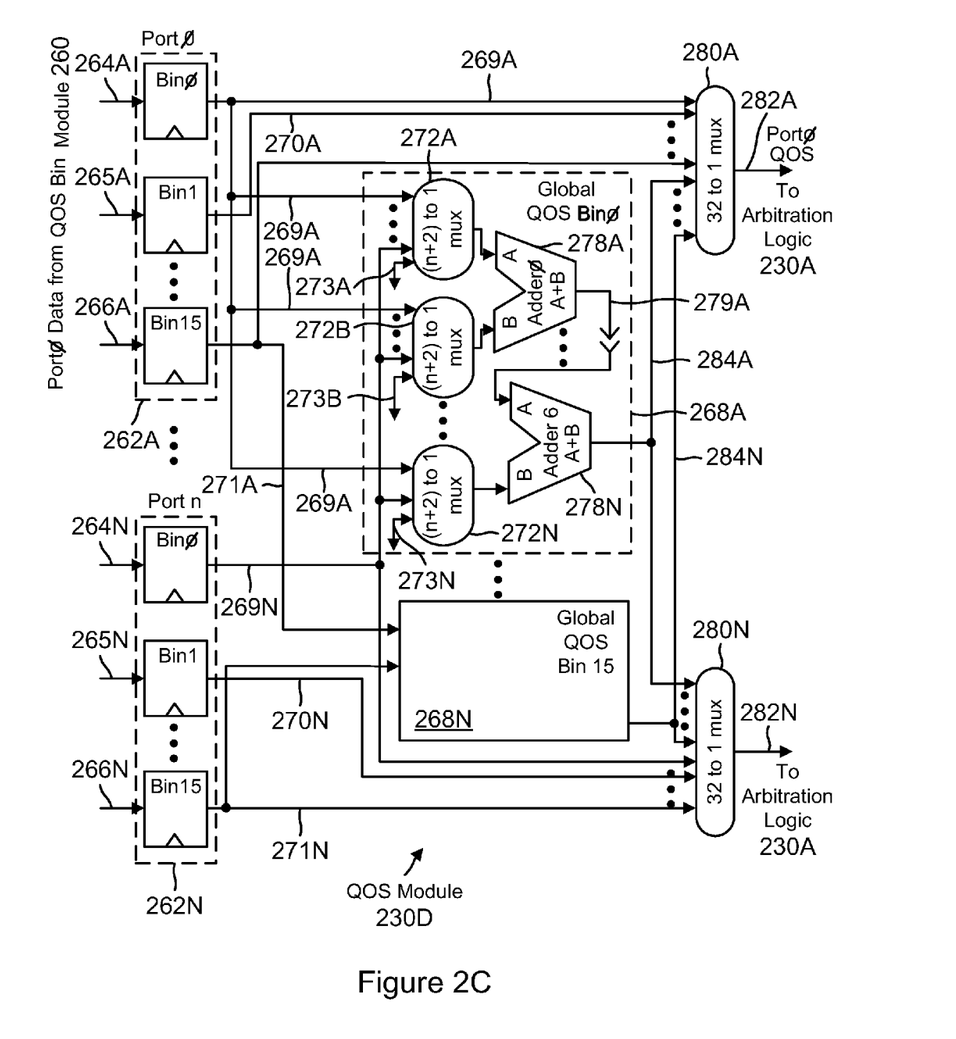
FIG. 2C is a functional block diagram of a QOS module within a global scheduler, according to the present embodiments.

FIG. 2C is a block diagram of the Global QOS module 230D that receives local QOS bin information 264A-264N, 265A-265N and 266A-266N from the local QOS bin module 260 (FIG. 2B). QOS information 264A-264N is for bin 0 for Ports 0-Port N. QOS information 265A-265N is for bin 1 for Ports 0-Port N. QOS information 266A-266N is for bin N for Ports 0-Port N. The information is based on the local QOS bins (for example, 0-15) that are maintained by QOS bin module 260. The local QOS bin information is for each port 128 of the switch element 120 and is used to generate QOS information 282A-282N that is provided to arbitration logic 230A, as described below. The QOS information may be similar to the QOS Priority shown in Table I and described below but inverted.

Global QOS module 230D includes a plurality of registers (or any other storage location types) 262A-262N that capture and store the local QOS information 264A-264N, 265A-265N and 266A-266N, respectively. For example, register 262A may be used to store the information for QOS bins 0-15 for Port 0, while register 262N may be used to store local QOS information for Port N. The stored QOS information is shown as 269A-269N, 270A-270N and 271A-271N.

Global QOS module 230D also includes Global QOS bins 268A-268N corresponding to the local QOS bins and having a plurality of logic elements. In one embodiment, when a port is a member of a non-local LAG, then the local QOS bin information is added such that the QOS information provided to the arbitration logic 230A is modified for the non-local LAG ports, as described below.

Each global QOS bin 268A-268N handles QOS information for each sub-port from corresponding local QOS bins. For example, global QOS bin 0 268A receives QOS bin 0 information 269A-269N. Global QOS bin 278B (not shown) receives local QOS bin information 270A-270N and Global QOS bin 268N receives local QOS bin information 271A-271N.

Each global QOS bin 268A-268N includes a plurality of multiplexers (Mux) for example, Muxs' 272A-272N at Global QOS bin 268A. Each Mux 272A-272N receives local QOS bin information, for example, Mux 272A receives QOS bin information 269A-269N. Muxs' 272A-272N are used to select the local stored QOS information for non-local LAG ports based on signals 273A-273N. For example, multiplexer 272A selects a port's stored QOS bin 0 information 269A-269N as the "A" addend for adder 278A. Multiplexer 272B selects another port's stored QOS bin 0 information 269A-269N as the "B" addend for adder 278A. The output 279A from adder 278A then becomes the "A" addend for the next adder in a series of adders'.

The number of adders' 278A-278N may be a function of the number of ports 128 within the non-local LAG. If for example, the number of ports 128 in a non-local LAG were to be eight (8), then seven adders may be used at Global QOS bin 268A. It should also be noted that there may be other ways to organize the adders. Furthermore, Muxs' 272A-272N may have an extra input that is tied to a value of zero as not all LAGs may use the maximum number of ports 128.

Once all ports 128 in a non-local LAG have been included any additional unneeded addends receive a zero value by the appropriate selections at Muxs' 272A-272N. The selection information 273A-273N is based on configuration information 230C. For example, configuration information 230C may store information identifying non-local LAG ports. Based on that information, local QOS bin information is selected and then added at global QOS bins 268A-268N. In one embodiment, the selection information 273A-273N may be binary values that control Muxs'272A-272N. The selection information values could be stored in registers that are accessible by a control processor (for example, 224, FIG. 2A) under firmware control.

The output from the last adder 278N is provided to Muxs' 280A-280N as 284A. The output from Global QOS bin 268N is then provided as 284N to Mux 280A-280N. In one embodiment, each sub-port has a Mux 280 associated with it. When a port is not a member of a non-local LAG, then the local QOS bin information is sent out as 282A to arbitration logic 230A. When a port is a part of a non-local LAG, then the added QOS information from global QOS bin 268A-268N is sent to arbitration logic 230A. When local QOS bin information is added for non-local LAG member ports, then the same QOS priority is used for all the non-local LAG member ports. This resultant QOS information, from the addition, is then used by the arbitration 230A to issue grants allowing data packets to be transmitted based on an approximated total of bandwidth consumed by all ports of the non-local LAG.

When a port is a member of a local LAG (i.e. all the ports are within the same base-port), then local QOS information from the same QOS bin is sent to the arbitration logic 230A. One reason for sending the local QOS information is that the same QOS bin is assigned to all the local LAG ports. Therefore, the local QOS information includes the bandwidth that is being used by all the local LAG ports.

The QOS computation circuit described above with respect to Global QOS bin 268A is also used for Global QOS bins 268B-268N. The processes describing the use of Global QOS bin module 230D are described below with respect to FIGS. 7 and 8.

Figure 3A:
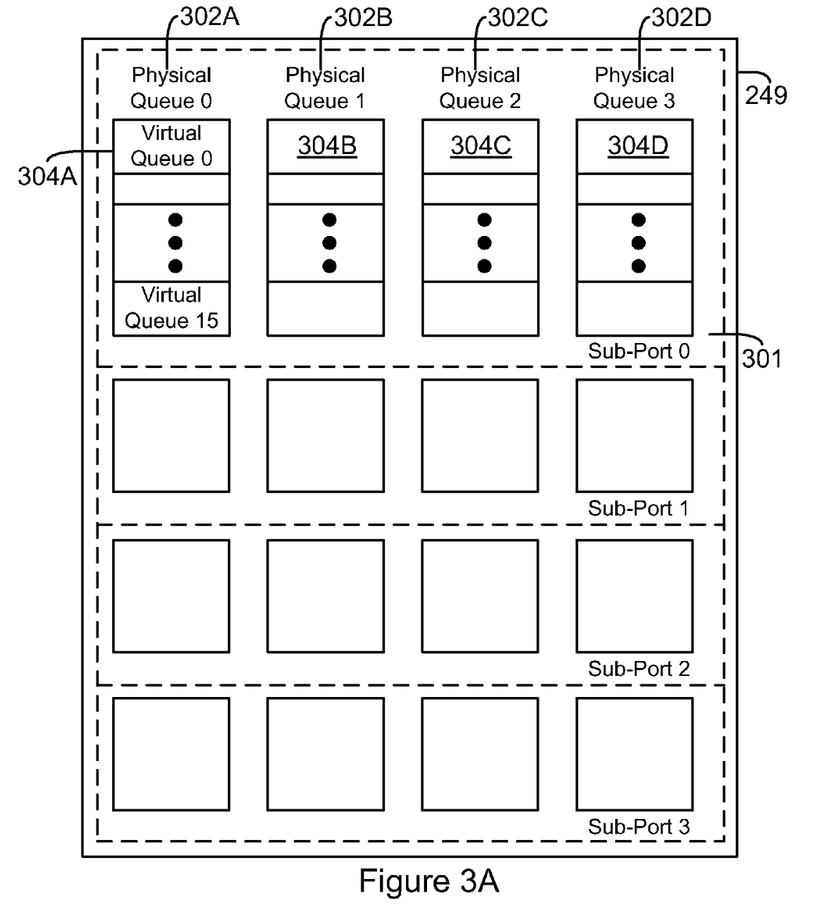
FIG. 3A is a functional block diagram of a queue block including a plurality of physical and virtual queues, according to the present embodiments.
Figure 4:
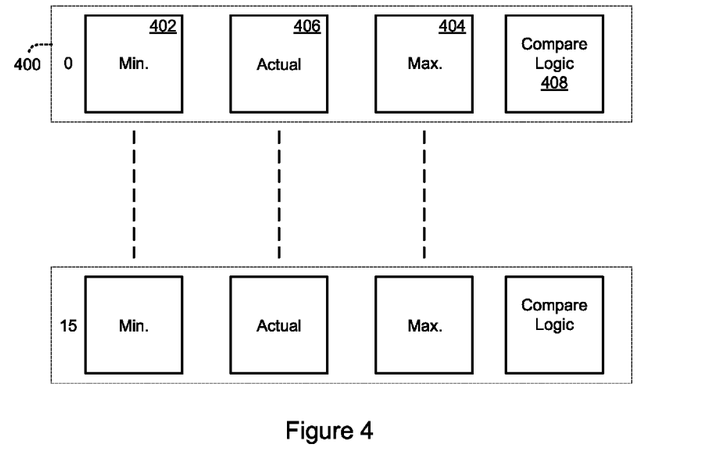
FIG. 4 is a functional block diagram of quality of service bins, according to the present embodiments.
Figure 7:
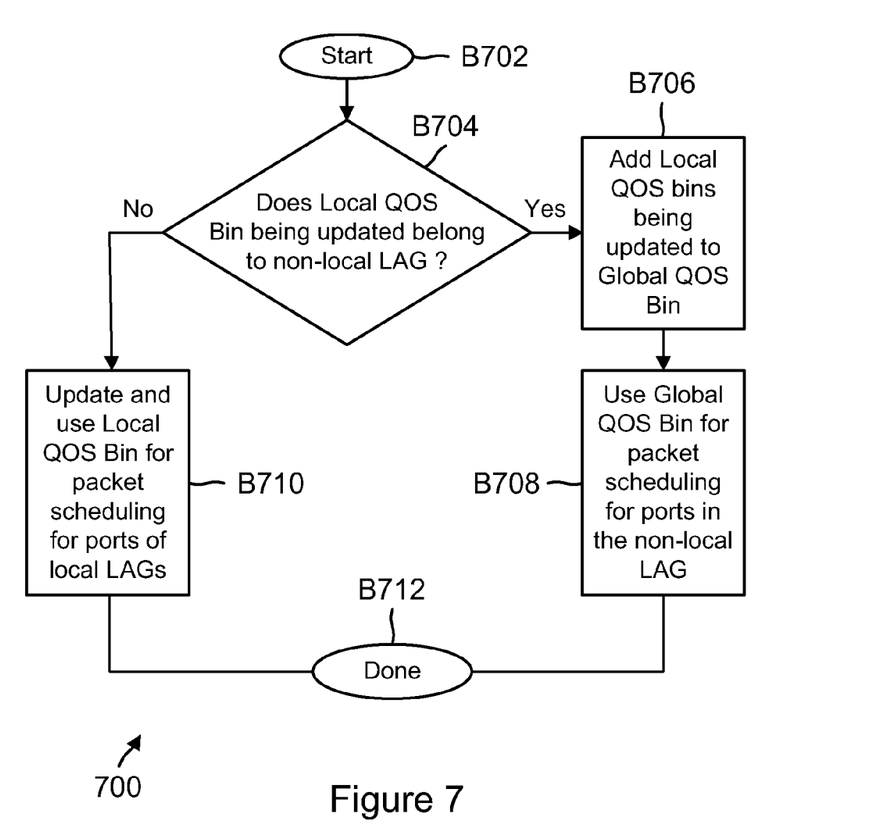
FIGS. 7-8 show process flow diagrams, according to the present embodiments.
Figure 8:
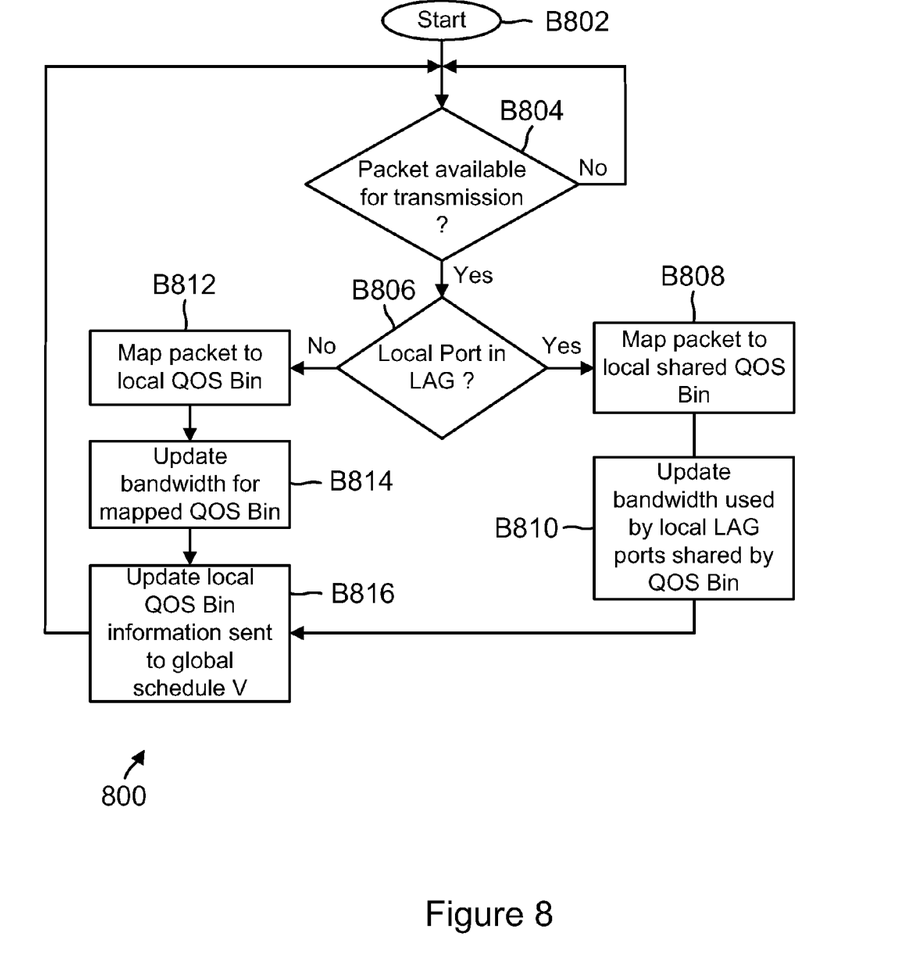

Before describing the processes of FIGS. 7 and 8, the following describes queues 249 (FIG. 3A) and QOS bin module 260 (FIG. 4). FIG. 3A shows that queues 249 may be subdivided into a plurality of queue sets 301 for each sub-port of base port 128. Each queue set 301 may include a plurality of physical queues, for example, four physical queues, shown as 302A-302D (may be referred to as physical queue or physical queues 302). Each physical queue 302 in turn includes a plurality of virtual queues (304A-304D), for example, sixteen virtual queues. For example, physical queue 302A includes virtual queues 304A, physical queue 302B includes virtual queues 304B and so forth. In one embodiment, there may be sixty-four virtual queues 304 for each sub-port.

In the illustrated embodiment, physical queues 302 illustrate a grouping of virtual queues 304 where they share the same link-level flow control. In other words, the link flow control is managed on a per physical queue basis. The virtual queues within a given physical queue are transmission gated by the same flow control. The physical and virtual queues do not hold or process frame data. The queues in the illustrated embodiment are used to hold configuration information. This configuration information identifies QOS bin and includes information for frame translation as shown in FIG. 3B.

Figure 3B:
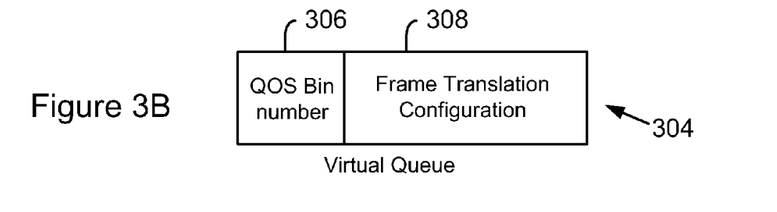
FIG. 3B is a functional block diagram of a virtual queue, according to the present embodiments.

With reference to FIG. 3B, a virtual queue 304 is used to store a plurality of fields for storing configuration information. The plurality of fields includes a QOS bin number 306 and frame translation configuration information 308. The use of the QOS bin number 306 is provided below in detail. The frame translation configuration information 308 is used to translate or modify an outgoing packet. The modification depends on the protocol of the received packet and the protocol of the packet that is transmitted.

With further reference to FIGS. 2A-2C, the Global QOS module 230D communicates with a plurality of base ports 128 and then allocates bandwidth to specific destination sub-port virtual queues 300 on a percentage basis from among a plurality of groups of source traffic. These source traffic groups may be, for example, enhanced transmission selection (ETS) traffic classes and/or quantized congestion notification (QCN) flows. ETS provides the capability to group types of data flow, such as storage or networking, and assigns a group identification number to each of the groups, which may also be called traffic class groups. QCN is part of the IEEE Data Center Bridging (DCB) standard proposal aimed at enhancing existing IEEE 802.1 bridge specifications to satisfy the requirements for I/O consolidation. The goal of QCN is provide end-to-end congestion notification for Layer 2 networks. Switches that support QCN can notify end hosts (which must also support QCN) about the presence of congestion in the network. The end hosts can then respond by reducing their traffic transmission, helping alleviate the upstream congestion. This extension is defined in the IEEE 802.1Qau standard, which is incorporated by reference herein in its entirety.

To implement the above-described QOS scheduling, each TBUF 206 as shared by each sub-port includes a plurality of source traffic group structures called QOS bins 400 (FIG. 4) that are maintained by the QOS bin module 260. Each of the virtual queues 304 is mapped to one of the QOS bins 400 using the QOS bin number 306 stored at each virtual queue 304. The virtual queues 304 mapped to a given QOS bin 400 comprise that QOS bin's source traffic group.

Each QOS bin 400 monitors the bandwidth consumed by its source traffic group and adjusts the scheduler QOS priority for the virtual queues 304 that are part of its source traffic group as the relationship between the bandwidth consumed versus the bandwidth allocated changes, as further described below. The mapping of virtual queues 304 to QOS bins 400 may remain constant, or change according to various circumstances. These circumstances may include change requests that are received for QCN flows or ETS flow. They may also include user input to redistribute the link's bandwidth among the different data flows using the transmit link. Multiple sub-ports may share the same QOS bin if the sub-ports belong to the same LAG. The TBUF may add the bandwidth consumed by multiple sub-ports to the same QOS bin. For example the QOS bin 400 from the lowest sub-port number of the LAG may be used.

FIG. 4 illustrates one example of QOS bins 400. The illustrated embodiment includes sixteen QOS bins 400, but in other embodiments any number of QOS bins 400 may be provided. Each QOS bin 400 comprises a minimum bandwidth limit threshold value 402, a maximum bandwidth limit threshold value 404, an actual bandwidth consumed counter 406, and comparison logic 408 that calculates QOS priority. The values of the minimum and maximum bandwidth limit threshold values 402, 404 may be programmable and set by firmware, for example, while the value of the actual bandwidth consumed counter 406 monitors bandwidth as bandwidth is consumed. However, the value of the actual bandwidth consumed counter 406 may be reset in response to certain events that are described below.

The comparison logic 408 of the QOS bins 400 calculates QOS priority dynamically, meaning that as packets for a QOS bin 400 are transmitted, the QOS bin's priority may change. When a QOS bin's priority changes, the priority of all of the virtual queues 304 associated with that QOS bin 400 are also changed.

Table I below provides one example for dynamically adjusting the priorities of the QOS bins 400:

TABLE I

| QOS Priority | QOS Priority Definition | Comment |
| --- | --- | --- |
| 7 | $X < \frac{1}{4}$ Min | Highest Priority |
| 6 | $\frac{1}{4}$ Min $\leq X < \frac{1}{2}$ Min | |
| 5 | $\frac{1}{2}$ Min $\leq X < \frac{3}{4}$ Min | |
| 4 | $\frac{3}{4}$ Min $\leq X <$ Min | |
| 3 | Min $\leq X < \frac{1}{2}$ Max | |
| 2 | $\frac{1}{2}$ Max $\leq X < \frac{3}{4}$ Max | |
| 1 | $\frac{3}{4}$ Max $\leq X <$ Max | |
| 0 | $X \geq$ Max | Lowest Priority |

Where: Min=Minimum bandwidth threshold value 402; Max=Maximum bandwidth threshold value 404; and X=Actual bandwidth consumed counter 406 value.

Thus, when a QOS bin 400 transmits packets, its QOS priority is reduced. For example, with reference to the first line of Table I above, if a given QOS bin 400 has transmitted less than one-quarter of the value of its minimum bandwidth limit threshold value 402, it will have a QOS priority of 7, which is the highest priority. As the QOS bin 400 transmits more packets, the value of its actual bandwidth consumed counter 406 increases. If the value of its actual bandwidth consumed counter 406 becomes greater than or equal to one-quarter of the value of its minimum bandwidth limit threshold value 402, but less than one-half of the value of its minimum bandwidth limit threshold value 402, its QOS priority will become 6, which is the second highest priority (second line of Table I above). Eventually, the value of its actual bandwidth consumed counter 406 may become greater than or equal to the value of its maximum bandwidth limit threshold value 404, at which point its QOS priority will become 0, which is the lowest priority (last line of Table I above). In one embodiment, a virtual queue may be configured such that when a QOS bin 400's priority is 0, it may be prevented from transmitting further packets until its actual bandwidth consumed counter 406 is reset, as detailed below. This function operates the same whether a port is grouped in a LAG or not.

In one embodiment, a same QOS bin is allocated to a plurality of sub-ports that are a part of a local LAG. Thus the same QOS bin tracks the bandwidth that is consumed by the LAG at any given time. This is efficient because it takes less space and the same logic element is used to track bandwidth usage for multiple ports.

Figure 5:
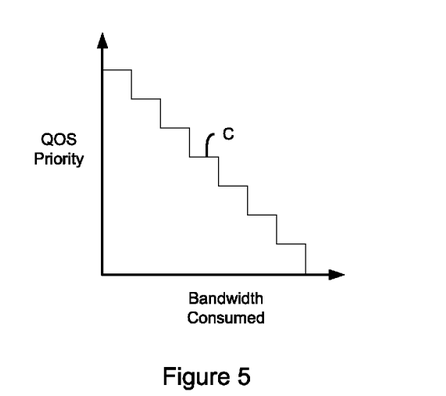
FIG. 5 provides a graphical illustration of QOS priority and bandwidth consumed, according to the present embodiments.

FIG. 5 illustrates graphically the relationship between QOS priority and bandwidth consumed according to the present embodiments. QOS priority is high when little to no bandwidth has been consumed, but reduces as more and more bandwidth is consumed. In the present embodiments, priority is decremented in a quantized fashion, as shown in Table I above, which shows eight distinct priority levels (QOS Priority 0-7). Hence, the curve C in FIG. 5 is stepped. As the number of distinct priority levels provided increases, the curve C becomes smoother. With enough distinct priority levels, the curve C approaches a smooth curve, which represents the ideal QOS priority scheme.

The values of the actual bandwidth consumed counter 406 for all QOS bins 400 are reset in response to certain events. For example, a scrub (reset) operation may be performed whenever a dirty indicator in any of the QOS bins 400 is set. The dirty indicator gets set when the actual bandwidth consumed counter 406 for a given QOS bin 400 becomes greater than or equal to the value of the maximum bandwidth limit threshold value 404 for that QOS bin 400. It remains set until it is cleared by a scrub operation.

In another example, a scrub operation may be performed when a scrub interval timeout event occurs. In yet another example, firmware may force a scrub operation. When a scrub operation is performed, the actual bandwidth consumed counters 406 for all QOS bins 400 may be reset (zeroed out), or divided by a divisor, such as 2.

In one embodiment, the QOS bins 400 may get loaded with a value equal to the amount that the actual bandwidth consumed counter 406 exceeded the value of the maximum bandwidth limit threshold. In another embodiment, the QOS bins 400 may get loaded with a value equal to the amount that the actual bandwidth consumed counter 406 had remaining until it was equal to the value of the maximum bandwidth limit threshold. The value loaded in the actual bandwidth consumed counter 406 would be the difference between the maximum bandwidth limit threshold 404 and the previous value of the actual bandwidth consumed counter 406 before the scrub. In this case it would be a value less than or equal to zero.

Figure 6:
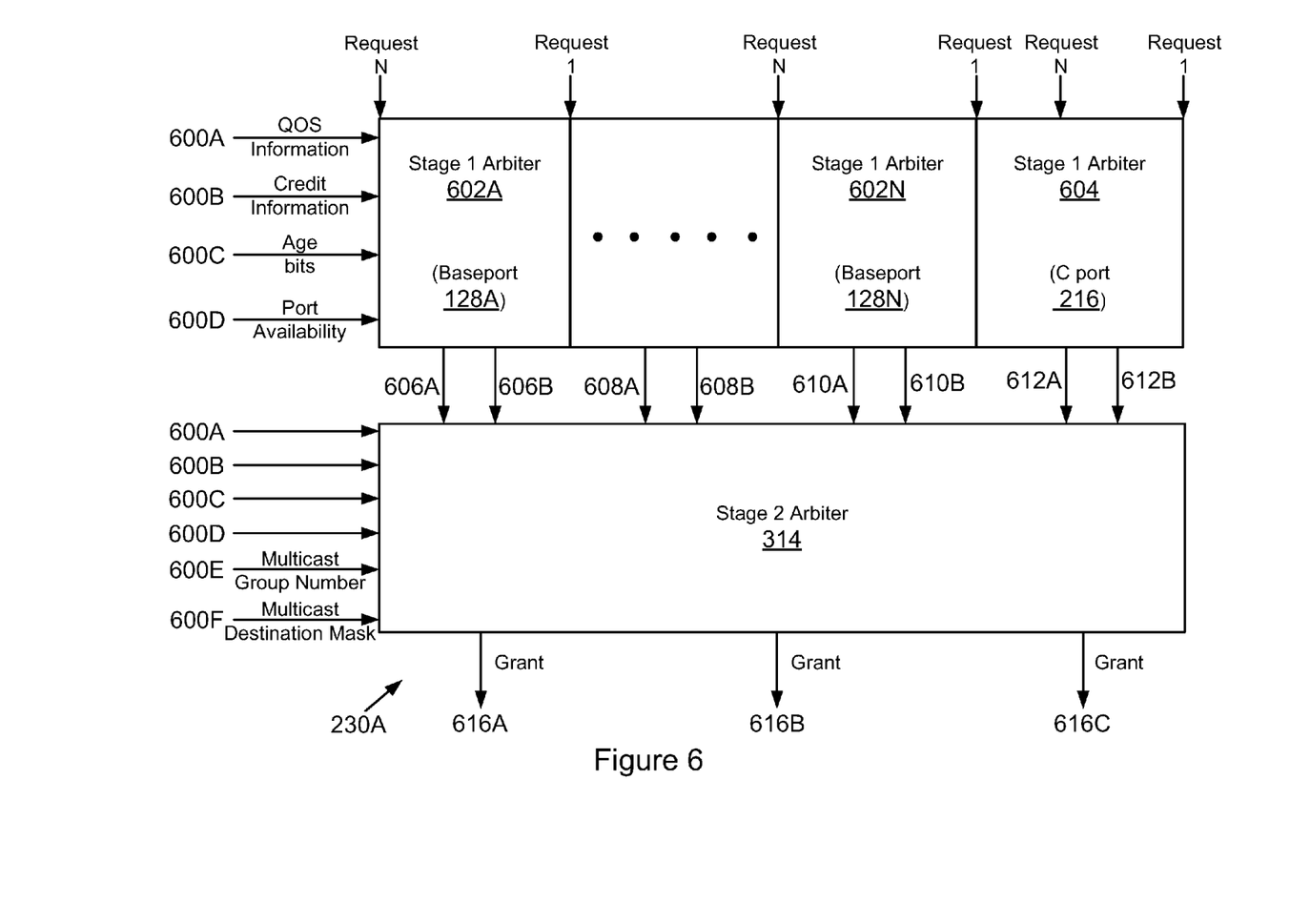
FIG. 6 shows an example of arbitration, used according to one embodiment.

FIG. 6 shows a block diagram of arbitration logic 230A, according to one embodiment. Arbitration logic 230A performs dual stage arbitration for selecting requests for transmitting packets that have been received at one or more RPORTs. The first stage selects more than one request (for example, two) from each base-port. The second stage then selects a request from among the requests that are selected from the first stage. In one embodiment, there are multiple requests and grants processed simultaneously.

The first stage may include a plurality of arbitration modules ("arbiters") 602A-602N and 604. Arbiters 602A-602N receive requests (shown as request 1-request N) from each base-port shown as base-port 128A-128N. In one embodiment, each base-port may send 32 requests to each stage one arbiter. Arbiter 604 may be dedicated for processing requests that are received from CPORT 216.

Each request received by a stage one arbiter is identified by a request number and also includes the identity of the sub-port that generates the request. The request number also includes the RPORT receive queue number providing the physical location where the frame may be stored at a RPORT. The request further includes a code that identifies the type of requests, i.e. whether the request is to the CPORT, the request is for a unicast frame or a multicast frame i.e. meant for more than one destination. If the request is for a multicast group, then the request includes an identifier identifying the multicast group. Each request also includes an identifier that identifies a destination sub-port.

Each request from a base-port (or a sub-port of a base-port) includes a destination transmit virtual queue number. This is used to identify one of the virtual transmit queues maintained at the transmit port that is being requested by a particular request. The request may also include a transmit port physical queue number field that is used to identify a physical transmit queue that is maintained at the destination sub-port.

Each request also includes a tag that includes a priority code and priority information for the request. The priority information is used by the stage one arbiter to select one of the requests from among a plurality of requests. How the priority code from the request is applied depends on how the request destination transmit virtual queue is configured for processing in the scheduler. Each virtual transmit queue may be configured in the scheduler for processing as high priority, fixed priority, QOS priority or QOS rigid priority. A high priority is the highest priority level, followed by fixed priority, QOS priority and QOS rigid priority.

The QOS information for all ports in the LAG is the same. A LAG can be thought of as a single high bandwidth link. The actual construction may be composed on multiple individual ports. The QOS information for any port in the LAG is approximately based on the total bandwidth consumed by all of the ports in the LAG.

To select a request for a base-port, arbiters 602A-602N and 604 receive real time inputs 600A-600D, according to one embodiment. Input 600A includes QOS information. The QOS information is the dynamically changing QOS Priority of the QOS bins as shown in Table I above.

Input 600B provides credit information for each transmit physical queue of a sub-port that has sent a request to a stage one arbiter. A network link partner's receiving port, typically has limited receive buffer space to store packets. The link partner's port reports its available space to transmitting ports as "credits" i.e. available storage space to store packets or uses a pause frame exchange to indicate lack of frame storage space. If the link partner's receive buffer storage is full and it cannot take any more packets, it means it is out of credit.

When a transmit physical queue of a transmitting port has zero credit, it means that it cannot transmit any packets associated with that transmit physical queue. Input 600B is used to determine if a transfer can occur because credit is available or a port has to wait until credit is unavailable at a destination link partner port. A link partner is another device not included within switch element 128, for example, ports on devices 122, 124 and 126. Arbiter 602A-602N and 604 use the credit information to select a request as described below in detail.

Input 600C provides age information for each request. The age information is used as tie-breaker to select a request from among a plurality of pending requests that may have the same priority. The age information 600C may be provided as age bits that indicate the relative age between requests. This allows stage one arbiters to select older requests having the same priority.

Input 600D are signals from each sub-port indicating whether the sub-port is available to receive packets from the crossbar 200 into TBUF 206 for transmission. This may be indicated by a single "available" bit. In one example, a bit value of 1 may indicate that a sub-port is available. The CPORT 216 may also send a bit value to indicate whether it is available or not. A sub-port may not be available because of its configured state or if it is currently busy processing a frame.

Arbiters 602A-602N and 604 may select two request for each base-port 128. The qualified request may be selected based on the priority code and if the priority code is the same, then age bits are used to select the oldest requests from among the highest priority qualified requests. A qualified request is one with a destination sub-port that is available and a transmit physical queue that has credit. In other words, qualified requests are requests where all of the requested resources to process the request and transmit the frame are available. The requests selected from the first stage (i.e. 606A/606B, 608A/608B, 610A/610B and 612A/612B) are sent to a second stage arbiter 614 that performs a second arbitration step.

Similar to the stage one arbiters, the second stage arbiter 614 also receives inputs 600B, 600C and 600D. In addition, second stage arbiter 614 receives input 600E for a multicast group and a destination mask 600F for handling multicast requests. In one embodiment, a multicast group maps a multicast group number 600E to a destination mask 600F that may be used by arbiter 614 to determine destination ports for a frame. The multicast group information may be stored in a static random access memory 230B (labeled as multicast group, FIG. 2B) accessible to scheduler 230. The use of inputs 600E and 600F in the second stage arbitration is described below.

Second stage arbiter 614 first selects the qualified requests based on priority. If there is more than one qualified request with the same highest priority, then age is used to select the oldest request from among the high priority requests. In one embodiment, age could be replaced by round-robin to select a request when there is more than one qualified requests with the same highest priority. In one embodiment, if more than one qualified request has the same highest priority and age then a round robin mechanism may be used to select one of the qualified requests having the same age and priority. In the illustrated embodiment, if two or more requests are asserted in the same clock cycle the age bit that represents the relative age between the two different requests has its value toggled. This toggling has the effect of rotating through requests age if a timestamp mechanism was used to provide age information of requests in place of the relative age bits used in the illustrated embodiment.

After the second stage arbitration, a grant pair (for example, a PBUF grant 616A and TBUF grant 616B, a PBUF grant 616A and CBUFO grant 616C or CBUFI grant and TBUF grant 616B) is generated and sent to the appropriate sub-port(s). In one embodiment, only one grant type is sent to the same port within a clock cycle. In other words, only one PBUF grant 616A and only one TBUF grant 616B will be sent to a given port at the same time, in the same clock cycle. Multiple grant pairs may be sent to sub-ports belonging to other base-ports within the same clock cycle.

The PBUF grant 616A identifies the request and includes a grant code that may be used to indicate if the grant is a unicast grant, partial multicast grant, a completed multicast grant or is not a grant. The grant code may be a 2-bit value. The PBUF receiving the grant deactivates the request for certain clock periods. When a TBUF receives a grant it also deactivates the signal indicating that it is "available" for the sub-port that got the grant. This prevents any grants to requests that have the same destination sub-port. After a transfer, the destination sub-port becomes available again as indicated by input 600D to the first stage and second stage arbiters.

In one embodiment, the TBUF grant 616B may also include a grant code similar to the PBUF grant. The TBUF grant also identifies a destination sub-port, source base-port identifier, a transmit port virtual and physical queue number. The CBUF grant 616C includes a source base-port number and an indicator indicating if the grant is valid or not.

FIG. 7 shows a process 700 for using the global QOS bin 268A-268N, according to one embodiment. The process begins in block B702, when the base ports 128 are initialized and operational. The base-ports at this stage may have received one or more packets. Some of the sub-ports of a base-port or the base-ports themselves may be a part of a local or non-local LAG. The LAGs themselves are configured as part of a management function, the details of which are not germane to the embodiments disclosed herein. The packets are processed and wait at PBUF 204, while a request for moving the frame to its destination or a next port is being arbitrated by the arbiters of scheduler 230.

In block B704, the process determines if a local QOS bin for a port that is being updated belongs to a non-local LAG. As described above, a non-local LAG means a LAG that includes ports from different base-ports. A local LAG means a LAG that includes ports from a same base-port. This sharing or grouping is accomplished by mapping multiple ports 128 within a base-port to the same QOS bin. If the port does not belong to a non-local LAG, then the local QOS bin information, similar to what is shown in Table I, is updated in block B710. The local QOS bin information is used for ports of a local LAG because all the ports of a local LAG share the same QOS bin.

When the ports are a part of a non-local LAG, then in block B706, the local QOS bin values for each port are added, as described above with respect to FIG. 2C. Thereafter, in block B706, the Global QOS bin values are used for packet scheduling for ports that are in a non-local LAG. The process is then complete in block B712.

FIG. 8 shows a process 800 using the Global QOS bins of FIG. 2C, according to one embodiment. The process begins in block B802, when switch element 120 is initialized and operational. In block B804, the routing sequencer 232 determines if a packet is available for transmission. If not, then the process simply waits, otherwise, in block B806, the process determines if the port that received the packet is part of a local LAG. This determination may be made based on port configuration information stored at common segment 236.

If the sub-port is part of a local LAG, then in block B808, the packet is mapped to a local shared QOS bin. The QOS bin in this case is shared among the member sub-ports of the local LAG. Thereafter, in block B810, the bandwidth used by the local LAG ports is updated.

If the local port in block B806 is not a part of a LAG, then in block B810, the packet is mapped to a local QOS bin. The bandwidth for the mapped QOS bin is updated in block B814 and the updated local QOS bin information is then sent to the global scheduler 230 in block B816. The updated information is then added by the Global QOS module 230D, as described above in detail with respect to FIG. 2C. The process then reverts back to block B804.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. For example, the embodiments disclosed herein may be implemented in adapters, network interface cards, routers and other similar devices. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A machine implemented method for providing quality of service (QOS) to a plurality of ports of a network device, where each port includes a plurality of sub-ports, comprising:
    configuring a plurality of sub-ports of a same port to operate in a local link aggregation group (LAG) for network communication;
    using a same local QOS bin for tracking bandwidth used by sub-ports of the local LAG;
    configuring a plurality of sub-ports of more than one port to operate in a non-local LAG;
    using a plurality of QOS bins for tracking bandwidth consumed by sub-ports of the non-local LAG;
    sending QOS information regarding bandwidth used by sub-ports of the local LAG and sub-ports of the non-local LAG to a global QOS module;
    adding bandwidth used by the sub-ports of the non-local LAG tracked by the plurality of QOS bins for selecting a request from among a plurality of requests for transmitting a packet by any sub-port of the non-local LAG; and
    using QOS information from the same, local QOS bin for selecting a request for transmitting a packet by any sub-port of the local LAG.

2. The method of claim 1, wherein the network device is a switch element having the plurality of ports.

3. The method of claim 2, wherein at least one of the plurality of ports of the switch element is configured to operate as a Fibre Channel port.

4. The method of claim 2, wherein at least one of the plurality of ports of the switch element is configured to operate as an Ethernet port.

5. The method of claim 2, wherein at least one of the plurality of ports of the switch element is configured to operate as a Fibre Channel over Ethernet port.

6. The method of claim 1, wherein the network device is an adapter.

7. A network device, comprising:
    a plurality of ports, each having a plurality of sub-ports for sending and receiving information; wherein a plurality of sub-ports of a same port are configured to operate in a local link aggregation group (LAG) for network communication and a plurality of sub-ports of more than one port are configured to operate in a non-local LAG; and
    a global quality of service (QOS) module for receiving QOS information from a local QOS bin used for tracking bandwidth consumed by sub-ports of the local LAG and from a plurality of QOS bins used for tracking bandwidth used by sub-ports of the non-local LAG;
    wherein for selecting a request from among a plurality of pending requests from any sub-port to transmit information, the global QOS module adds bandwidth consumed by sub-ports of a non-local LAG tracked by the plurality of QOS QOS bins; and uses local QOS information from the same local QOS bin assigned to the sub-ports of the local LAG.

8. The network device of claim 7, wherein the network device is an adapter.

9. The network device of claim 7, wherein the network device is a switch element having the plurality of ports.

10. The network device of claim 9, wherein at least one of the plurality of ports of the switch element is configured to operate as a Fibre Channel over Ethernet port.

11. The network device of claim 9, wherein at least one of the plurality of ports of the switch element is configured to operate as a Fibre Channel port.

12. The network device of claim 9, wherein at least one of the plurality of ports of the switch element is configured to operate as an Ethernet port.

13. A network device, comprising:
    a plurality of base-ports, each base-port having a plurality of sub-ports for sending and receiving information; wherein multiple sub-ports of a same base-port are configured to be a part of a local link aggregation group (LAG) for sharing bandwidth to transmit information and multiple sub-ports of different base-ports are configured to be a part of a non-local LAG for transmitting information;
    a local QOS bin for each sub-port for tracking bandwidth used by each sub-port; wherein each local LAG is assigned a local QOS bin for tracking bandwidth used by multiple sub-ports of the local LAG and a plurality of QOS bins are used to track bandwidth consumed by sub-ports of the non-local LAG; and
    a global quality of service (QOS) module for adding bandwidth consumed by the multiple sub-ports of the non-local LAG for selecting a sub-port to transmit information from among the multiple sub-ports of the non-local LAG.

14. The network device of claim 13, wherein the network device is a switch element.

15. The network device of claim 14, wherein at least one sub-port of the switch element is configured to operate as a Fibre Channel port, an Ethernet port and as a Fibre Channel over Ethernet port.

16. The network device of claim 13, wherein the network device is an adapter.

* * * * *